United States Patent [19]

Simmons et al.

[11] 4,158,881
[45] Jun. 19, 1979

[54] DC TO DC CONVERTER

[75] Inventors: David H. Simmons, Palo Alto; Alfredo A. Panelo, San Jose, both of Calif.

[73] Assignee: Litton Systems, Inc., San Carlos, Calif.

[21] Appl. No.: 914,755

[22] Filed: Jun. 12, 1978

[51] Int. Cl.² .................................. H02M 3/335
[52] U.S. Cl. .................................. 363/25; 363/97
[58] Field of Search .............................. 363/24–26, 363/97

[56] References Cited

U.S. PATENT DOCUMENTS

| | | | |
|---|---|---|---|
| 3,439,251 | 4/1969 | Schaefer | 363/97 |
| 3,582,754 | 6/1971 | Hoffmann et al. | 363/18 |
| 3,745,440 | 7/1973 | Lord | 363/17 |
| 4,017,784 | 4/1977 | Simmons et al. | 363/17 |
| 4,025,862 | 5/1977 | Gautheron | 363/97 X |
| 4,055,790 | 10/1977 | Gerding et al. | 363/24 |

Primary Examiner—William M. Shoop
Attorney, Agent, or Firm—Norman E. Brunell; W. R. Thiel

[57] ABSTRACT

In a DC to DC converter, an improvement for reducing the peak current level through the electronic charging switches including an inductance in series between the junction of the clamping diodes and the junction between the primary side of the transformer and the primary capacitor.

12 Claims, 18 Drawing Figures

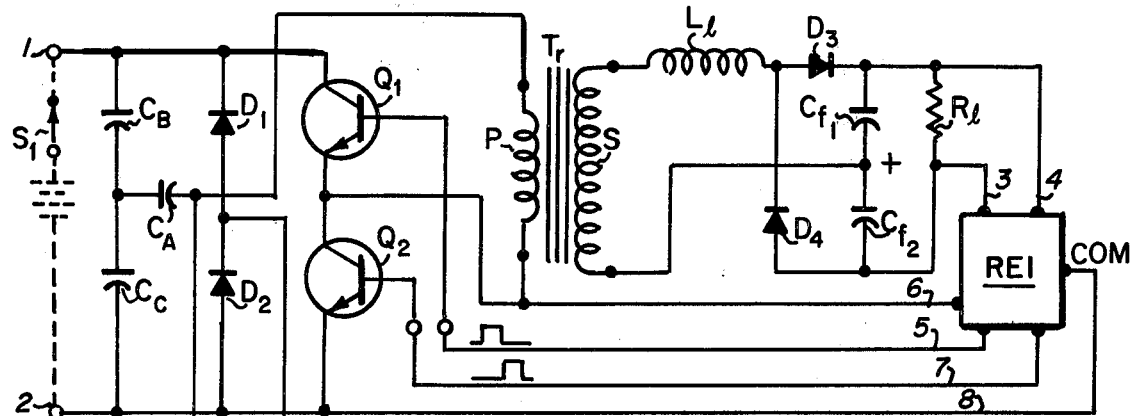
Fig._1
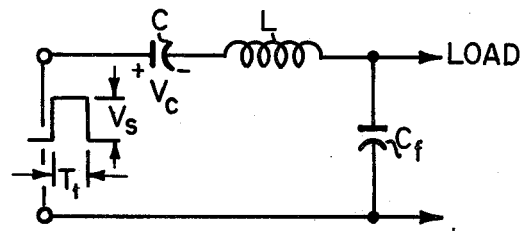
Fig._2
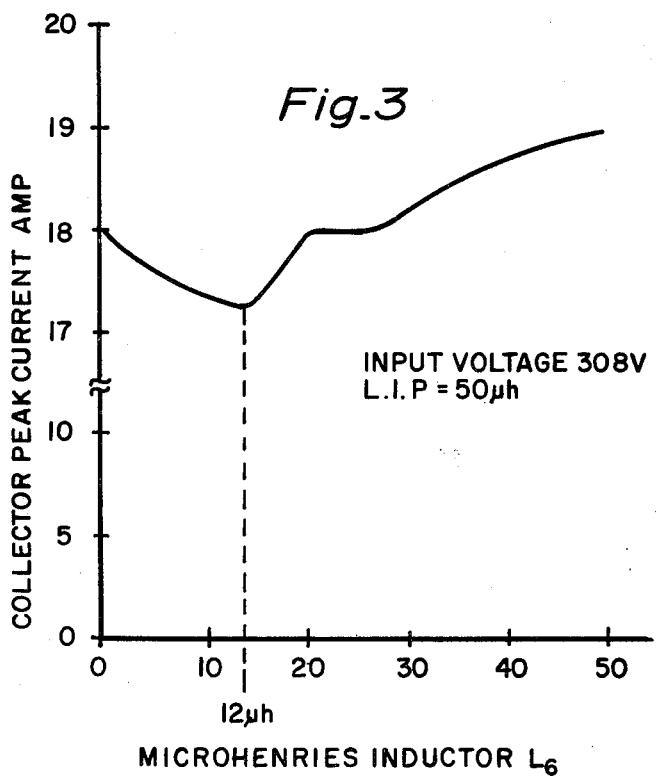
Fig._3
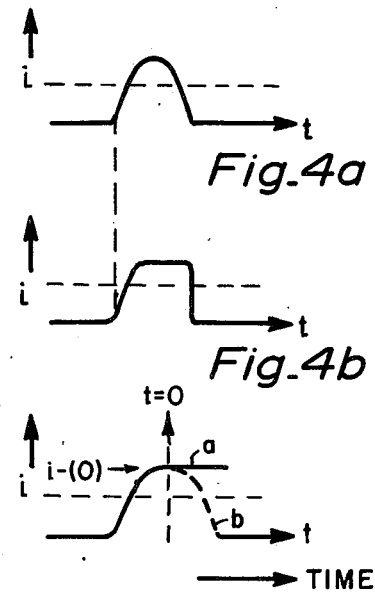
Fig._4a
Fig._4b
Fig._4c

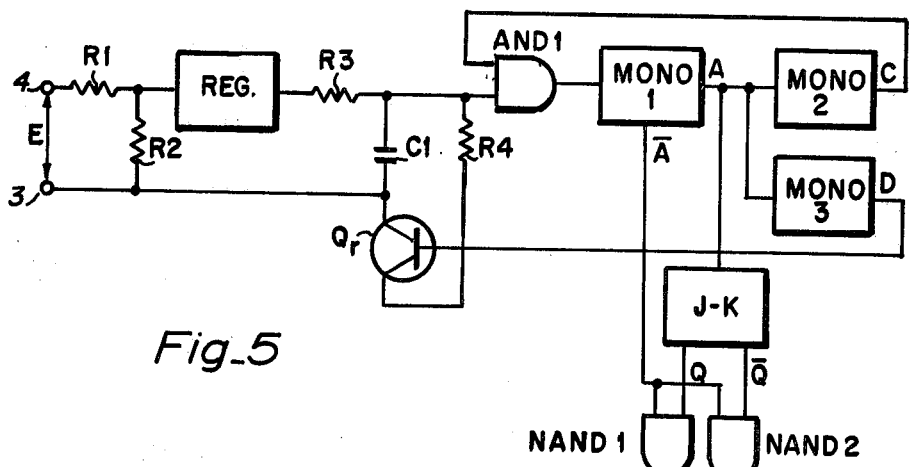
Fig_5
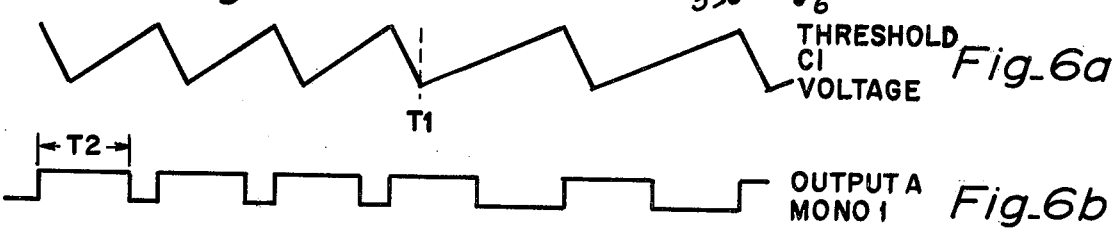
Fig_6
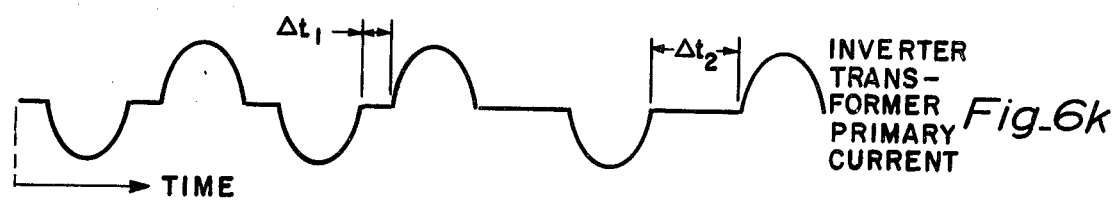

DC TO DC CONVERTER

BACKGROUND OF THE INVENTION

This invention relates to DC to DC converters and, more particularly, to an improvement to a DC to DC converter in which the output voltage may be regulated against variations in input voltage and output current of the type described in U.S. Pat. No. 4,017,784. A DC to DC converter, as is known, converts the DC voltage provided by a DC source at an input to an output voltage level which may be different from that of the DC source. By way of example, this type of voltage-converting device finds application as part of traveling wave tube amplifier system where a low voltage DC source must be converted to one or more high voltage DC sources suitable to operate the electrodes of a traveling wave tube.

One converter which has been heretofore employed in such a traveling wave tube amplifier system uses a transformer having a primary and a center tapped secondary, with the secondary winding ends connected through rectifiers and connected in series with a large inductor for connection to one end of a load between the inductor and the secondary winding tap and with a pair of switches, such as transistor switches, connected in series circuit to alternate ends of the input, with one end of the primary winding connected to the juncture of the two transistor switches and the other end of the primary winding connected to the juncture of a series connected pair of capacitors connected across the input, with means responsive to the load voltage for varying the periodicity of control pulses alternately applied to the transistors. A sophisticated example of this type of circuit of which we have knowledge appears in U.S. Pat. No. 3,745,440 to Lord, owned by the assignee of the present invention. In the aforedescribed circuit, to an approximation, the current passed by the inverter transistors into the transformer primary is of a ramplike waveform; the current increases linearly in level with lapse of time to a predetermined maximum and then abruptly terminates. The output voltage is controlled by means varying the ratio of the "on" time of the transistor switches to the time of a half cycle. It is recognized that the inductor used in such device is bulky and heavy. Moreover, as a result of the ramp-shaped waveform of the primary current, the peak current through the transistor switches is at least twice the average current. This limits the peak power which can safely be handled by the device because of current and voltage limitations on presently available transistors. Additionally, the transistor must switch from a current-conducting or "on" state to a noncurrent-conducting or "off" state at a time when its collector current is at the highest level. Thus, in the foregoing converter a good deal of power is dissipated in the transistors during the interval in which the transistor is turning off. Furthermore, an undesirable side-effect of the fast rise and fall of current in the operation of the aforedescribed prior art circuit, the converter generates levels of high frequency electromagnetic energy that could cause interference.

By way of further background, a voltage converter design is presented in U.S. Pat. No. 3,582,754 to Hoffman et al. Hoffman discloses a DC to DC converter that is self-oscillatory, i.e. a secondary winding on the transformer is used to provide AC voltage feedback to the switching transistors, but which does not contain any separate control circuit to vary the width or the duty cycle of his primary currents. The converter in the Hoffman patent shows the use of a capacitor which in conjunction with an inductance produces half sinusoids of current in a transformer primary and in which the leakage reactance existing between the primary and secondary winding is used as the inductance. The Hoffman converter shows the use of a pair of series connected diodes to clamp the peak voltage excursion at one location, not directly across the capacitor, within the circuit as is brought out in the patent. And Hoffman further includes an additional inductance in series between the capacitance and the diodes having a reactance value substantially equal and opposite to the reactance of the capacitor to prevent lowering of the operating frequency in his inverter arrangement, which in symbolic appearance resembles the present invention. The Hoffman circuit is intrinsically nonregulating, and line voltage regulation is achieved by the use of "add-on" devices. As becomes apparent hereinafter, although the circuit of Hoffman contains features which are similar to the structure found in the present invention, the arrangement and cooperation of elements differs and achieves a different result.

By way of further background to our invention, reference is made to U.S. Pat. No. 4,017,784, granted Apr. 12, 1977 to P. Launderville and D. Simmons, a coinventor of the present invention, the disclosure of which is by reference incorporated herein in its entirety. A DC to DC converter is there disclosed in which a sinusoid-shaped current flows through the primary of the transformer and the converter's output voltage is regulated by spacing the alternate polarity sinusoidal currents more closely together or farther apart in time of occurrence as well as other structural and functional aspects which the interested reader may obtain from review of the cited patent. That DC to DC converter combination includes a transformer containing a primary winding and a secondary winding on a structure of magnetic material with said secondary winding being "loosely coupled" to the primary winding to provide a predetermined effective leakage inductance characteristic as reflected to said primary winding; rectifier means connected to said secondary winding for rectifying the AC from the secondary winding to DC; filter capacitor means coupled to the output of said rectifier means for smoothing said rectified voltage; means for connecting an electrical load across said filter capacitor means; a second capacitor, said second capacitor connected in series circuit with said primary winding; input means for receiving a DC voltage for conversion to a different DC voltage required by the electrical load; electronic switching means for periodically and alternately charging said second capacitor in a first direction over a first interval of time T followed by charging said second capacitor means in a second opposite direction over a second interval of time T in a charging current path going through said primary winding, said charging current being derived from a DC voltage applied at said input means, with the second capacitor being sized in its capacitance value relative to said transformer leakage inductance characteristic and to the electrical impedance characteristics of said electrical load and said filter capacitor means for causing said charging current in said current path to be of a waveform essentially of half sinusoids over a portion of each said time interval; clamping diode means coupled to said second capacitor means for limiting the level of voltage across said second capacitor means to below the level applied across said input means; and regulating means coupled to said electronic switching means for regulating said interval of time, T, or said periodicity thereof, as a function of voltage level monitored across said filter capacitor means for maintaining the voltage derived across said filter capacitor means through the inverter action at a constant level irrespective of DC voltage level variation at said input means.

As those skilled in the art appreciate, many factors limit the power handling capability, the output wattage of a given converter, including that disclosed in U.S. Pat. No. 4,017,784. A major factor is the "peak" current handling capability of the inverter transistors. Thus, if a given "peak" current in a circuit exceeds that permissible in a given inverter transistor, the expensive transistor will be "wiped-out" or destroyed, even though the "average" current through the transistor has not been exceeded, as is recognized by those skilled in the art. Therefore, the designer must ensure that the peak currents do not exceed the permissible level for a given transistor under foreseeable circuit operating conditions.

A somewhat direct relationship exists between the peak and average currents in the inverter transistor circuit: By reducing the peak current allowed to pass through the transistor the average current through the transistor is also reduced. And since the power output of the transistor is measured in terms of the average current, the power output is accordingly also reduced. Frequently this reduction, based on the foregoing design considerations, places the actual converter power output below the actual power handling capability of the converter's inverter transistors.

One condition in which large peak currents occur, common to many electronic circuits, is when the converter is turned "on" and operating electrical power is initially applied to the converter. The large filter capacitor located in the secondary circuit of the converter is initially uncharged and at that time presents a very low electrical impedance at the secondary winding; hence, the charging currents are very large until the secondary capacitor becomes charged in normal converter operation. That impedance is reflected into the primary winding, as is understood by those skilled in the art, and during the initial period the inverter transistors must carry electrical currents much larger than they pass when the secondary filter capacitor is charged and the converter is operating in its "steady-state" condition.

The present invention is based upon our discovery that an electrical inductance means placed in series circuit between said primary or "first" capacitor and the diodes in the previously described converter of U.S. Pat. No. 4,017,784, provides beneficial results in relation to peak currents. If the inductance means is of a certain inductance value or size, the "peak" electrical current through the inverter switching transistors, at the time of initial turn-on or activation, is reduced. And if the inductance means is of a second inductance value the "peak" electrical current through the inverter transistor switches, during steady-state operation of the converter, is also reduced.

A principal purpose of our invention therefore is to provide an improved DC to DC converter and particularly to provide an improvement to the DC to DC converter of the type disclosed in U.S. Pat. No. 4,017,784 having increased power output capability. An ancillary object is to reduce peak currents carried by inverter transistors without significantly reducing average current carried by those transistors. An overall object of our invention is to provide a more reliable DC to DC converter.

SUMMARY OF THE INVENTION

In a DC to DC converter containing a transformer means, said transformer means including: a primary winding, and a secondary winding, said secondary winding being loosely coupled to said primary to provide a predetermined effective leakage inductance reflected to said primary winding; rectifier means connected to said secondary winding for supplying a rectified output; filter capacitor means coupled to the output of said rectifier means for smoothing said rectified voltage; means for connecting an electrical load across said filter capacitor means; second capacitor means, said second capacitor means connected in series circuit with said primary winding; input means for receiving a DC voltage for conversion to a different DC voltage; electronic switching means for periodically and alternately charging said second capacitor means in a first direction over a first interval of time T followed by charging said second capacitor means in a second opposite direction over a second interval of time T in a current path including said primary winding, said charging current derived from a DC voltage at said input means, said second capacitor means being sized relative to said leakage inductance of said transformer and to the impedance characteristics of said electrical load and said filter capacitor means for causing said current in said current path to have the waveform essentially of half sinusoids over a portion of each time interval; clamping diode means coupled to said second capacitor means for limiting the level of voltage across said second capacitor means to below the level applied across said input means; regulating means coupled to said switching means for regulating said interval of time, T, or said periodicity as a function of voltage level monitored across said filter capacitor means for maintaining said voltage across said filter capacitor means at a constant level irrespective of the voltage variation at said input means; the improvement in combination therewith of inductor means, with said inductor means connected in series circuit in the circuit between said clamping diode means and said second capacitor means. In a specific aspect, said inductance means comprises an inductance $\lambda$ of $0<\lambda<\frac{1}{2}$ LIP, where LIP is said leakage inductance of the transformer reflected to said primary. In an alternative aspect, said inductance means comprises an inductance $0.9$ LIP$\leq\lambda\leq 1.1$ LIP. In a further aspect, said combination includes means to change said inductance means from one inductance level to another.

The foregoing objects and advantages of the invention as well as the structure characteristic of the invention is better understood by making reference to and considering the detailed description of the preferred embodiments of the invention which follows taken together with the illustrations of the drawings.

BRIEF DESCRIPTION OF DRAWINGS

In the drawings:

FIG. 1 illustrates a preferred embodiment of the invention in partial electrical schematic form and partial block diagram;

FIG. 2 illustrates an equivalent circuit diagram of a portion of the embodiment of FIG. 1;

FIG. 3 graphically depicts the variation in peak current as a function of the selected value of the inductance in one specific embodiment of FIG. 1 during steady state conditions;

FIGS. 4a, 4b and 4c graphically illustrate primary current waveforms possible under initial turn-on conditions for one specific embodiment of FIG. 1;

FIG. 5 illustrates in block diagram form, a regulator circuit useful in the preceding embodiments; and FIGS. 6a–6k graphically illustrate exemplary waveforms of voltages and currents occurring in the normal operation of the regulator of FIG. 5.

DESCRIPTION OF THE PREFERRED EMBODIMENTS

The embodiment of FIG. 1 includes capacitors $C_A$, $C_B$, $C_C$, diodes $D_1$ and $D_2$, transistors $Q_1$ and $Q_2$, inductors $L_5$ and $L_6$, switch $S_2$, element $S_3$, transformer $T_r$ containing a primary P and a secondary winding S of a familiar construction in which the primary and secondary are "loosely coupled" magnetically, and the resulting primary to secondary leakage inductance is illustrated as a discrete series connected inductance $L_l$ in the secondary circuit. The embodiment further includes rectifier diodes $D_3$ and $D_4$, filter capacitors $C_{f1}$ and $C_{f2}$, load $R_l$, represented as a resistance, and regulator $RE_1$, which is represented in block diagram form. The symbols representative of all of the known devices and elements included in this circuit are well understood by those skilled in the art. As is illustrated, filter capacitor $C_{f1}$ is connected to a first end of secondary S and to the cathode end of diode $D_3$. The anode end of $D_3$ is in turn connected to the remaining end of secondary S. Capacitor $C_{f2}$ is connected to the first end of secondary S and to the anode end of diode $D_4$. The cathode end of $D_4$ is connected to the remaining end of secondary S. The load $R_l$ is connected across the series combination of $C_{f1}$ and $C_{f2}$. This is the well-known full-wave doubler rectifier circuit in which two series circuits of diode and capacitor are connected in parallel across a transformer secondary. Other secondary winding arrangements and rectifier circuits may be substituted as is recognized by those skilled in the art. The rectifier is shown as a full-wave doubler for convenience, and because this is a suitable configuration where a high voltage output is required. The converter is also well adapted to the use of a center-tapped full-wave rectifier circuit, a bridge rectifier, or other well-known rectifier filter configuration. Transistor $Q_1$ and $Q_2$, both of the NPN type, are connected with their collectors and emitters in electrical series circuit across converter inputs 1 and 2. And capacitor $C_B$ is connected in series circuit with capacitor $C_C$ across inputs 1 and 2. Diode $D_1$ is connected in series with diode $D_2$ across input 1 and 2 with the diodes electrically poled in the same direction and the anode of diode $D_2$ connected to input terminal 2. Capacitor $C_A$ is connected at one end to the circuit juncture between capacitors $C_B$ and $C_C$ and at its other end to one end of inductor $L_5$ and to one end of the primary winding P. Inductor $L_5$ is shunted by switch $S_2$, shown open, and is connected in electrical series circuit with inductor $L_6$. The remaining end of inductor $L_6$ is connected to the circuit juncture between the cathode of diode $D_2$ and the anode of diode $D_1$. The remaining end of primary P is connected in common circuit with the collector of $Q_2$ and the emitter of $Q_1$. Inputs 3 and 4 of regulator $RE_1$ are connected across the load $R_l$ and circuit commons are connected via leads 6 and 8 to the respective emitters of transistors $Q_1$ and $Q_2$. The outputs of regulator $RE_1$, 5 and 7, are connected to a respective one of the bases of transistors $Q_1$ and $Q_2$. Regulator $RE_1$ supplies voltage pulses, alternately, to the base of transistor $Q_1$ and then transistor $Q_2$ and repeats that output sequence at a rate or periodicity dependent upon the voltage across inputs 3 and 4. The source of DC provided to the converter input is represented in dash lines by the conventional battery symbol and is shown connected in series circuit with a "power-on" switch $S_1$, in the closed or "on" position.

In operation, the DC source voltage of a desired level is applied across terminals 1 and 2 with the positive polarity at terminal 1. From that source of voltage, capacitors $C_B$ and $C_C$ receive an electrical charge and, inasmuch as capacitor $C_B$ is of the same capacitance value as capacitor $C_C$, the voltage divides evenly across the capacitors with one-half the voltage level across each. A first output pulse from regulator $RE_1$ is applied via lead 5 to the base of transistor $Q_1$ and transistor $Q_1$ switches from a noncurrent-conducting state to a current-conducting state for the duration of that base input pulse. Current thus flows in a path from terminal 1, collector and emitter or $Q_1$, primary P through capacitor $C_A$ and capacitor $C_C$ back to the source through terminal 2. As more particularly described hereinafter, the waveshape of the current is that of a half sinusoid, such as depicted in FIG. 6k, inasmuch as the capacitance of $C_A$ is matched to the leakage inductance $L_l$ of transformer $T_r$. Regulator $RE_1$ terminates the input pulse to the base of $Q_1$ and after a predetermined interval applies a voltage pulse over lead 7 to the base of transistor $Q_2$. Upon removal of the pulse from the base of $Q_1$, $Q_1$ restores to its nonconducting state. Conversely, with the application of the pulse to the base of $Q_2$, $Q_2$ switches into its current-conducting condition for the duration of that input pulse. In so doing, current flows in a path from input terminal 1, capacitor $C_B$, capacitor $C_A$, one end of primary P through the collector and emitter of transistor $Q_2$ and back to the source over input terminal 2. The current in this instance flows through primary winding P in a direction opposite to the direction of current passed by transistor switch $Q_1$. However, the current waveshape is likewise a half sinusoid inasmuch as capacitor $C_A$ is matched to leakage inductance $L_l$. At the conclusion of the pulse on the base of $Q_2$, $Q_2$ restores to its noncurrent-conducting condition and current through primary P ceases.

After a predetermined interval the regulator applies another pulse over lead 5 to the base of $Q_1$ and the entire process is repeated. Effectively, an AC current is produced in primary P which induces through transformer action a voltage in the secondary winding. When the voltage at the upper end of winding S is positive relative to the lower end, current flows through secondary S, diode $D_3$ to charge capacitor $C_{f1}$. Similarly, when the lower end of secondary S is positive relative to the upper end, current flows through diode $D_4$ to charge the filter capacitor $C_{f2}$. The voltages to which the capacitors $C_f$ and $C_{f2}$ are charged are additive. Hence, the voltage presented to load $R_l$ is the sum of the voltages on the capacitors.

Referring again to capacitor $C_A$ and the associated diodes $D_1$ and $D_2$, it is apparent that if the voltage at the anode end of diode $D_1$ begins to exceed the voltage at input 1, $D_1$ conducts current. Hence, the voltage across $C_A$ on one-half cycle cannot exceed that on $C_B$ and the diodes serve to "clamp" the voltage across $C_A$. Similarly, if the voltage at the end of $C_A$ is of a level and of negative polarity which attempts to exceed the voltage level of $C_C$, diode $D_2$ conducts to prevent this circuit juncture from exceeding the voltage level across $C_C$. The diodes thus act as a voltage clamping circuit and serve a function in the combination that becomes more apparent from the following description. It is noted that in the event the diodes conduct current, current flows through the series connected inductor $L_6$ (and perhaps $L_5$) and that the voltage across $C_A$ is less than that of the input 1 at the end of each cycle as becomes more apparent from the discussion of the additions hereafter. The voltage across load $R_l$ is monitored via leads 3 and 4 by regulator $RE_1$. In the preceding description it is assumed that the load voltage is of a predetermined level and a certain pair of pulses were alternately applied to leads 5 and 7, each of a predetermined duration, and repeated after a predetermined interval of time $T_2$. The regulator circuit includes a means to relate the output voltage level with the repetition rate at the output of regulator $RE_1$ through conventional circuitry. As the voltage across the load increases above the desired level the regulator reduces the periodicity of the output pulses. Conversely, as the output voltage lowers from the desired level the periodicity increases. With increased frequency the quantity of energy induced in the secondary windings increases to increase the voltage and with reduced periodicity the quantity of energy in the secondary is reduced. As becomes clear from the analysis of the circuit, such a result is not possible without the clamping diodes $D_1$ and $D_2$. Considering a mathematical equivalent circuit presented in FIG. 2, the mode of operation may be analyzed by those skilled readers familiar with this type of device. The equivalent circuit shows a voltage pulse of amplitude $V_s$, equal to the secondary voltage appearing between the ends of secondary S of transformer $T_r$, and of a duration $T_1$ applied to a series circuit consisting of capacitor C, equivalent to capacitor $C_A$ of FIG. 1, and inductor L equivalent to the leakage inductance $L_l$ in FIG. 1, and the output filter capacitor $C_f$ which in the steady state condition described is charged to the desired output voltage $V_o$. In the analysis that follows it is assumed that the filter capacitor $C_f$ is substantially larger than capacitor C so that the output voltage $V_o$ may be assumed to be constant during the duration of input voltage pulse $V_s$. The instantaneous current through the circuit may be written as:

$$i = \left(\frac{V}{\sqrt{L/C}}\right) \sin\left(\frac{t}{\sqrt{LC}}\right) \quad (1)$$

where i is the instantaneous current at time t, a variable, and $V_c$ is the voltage on capacitor C at the time of application of voltage pulse $V_s$. The voltage V is defined by the following equation:

$$V = V_s - V_c - V_o$$

From Equation 1 it is seen that:

$$\int_0^{T_1} i\, dt = \frac{V}{\sqrt{L/C}} \int_0^{T_1} \sin\frac{t}{\sqrt{LC}}\, dt = \quad (3)$$

$$V \cdot C \left[1 - \cos\left(\frac{T_1}{\sqrt{LC}}\right)\right]$$

If $\Delta V_c$ is the overall change in $V_c$ during the application of the voltage pulse then:

$$\Delta V_c = \frac{1}{C}\int_0^{T_1} i\, dt = V\left[1 - \cos\left(\frac{T_1}{\sqrt{LC}}\right)\right] \quad (4)$$

$$V_c = -\tfrac{1}{2}\Delta V_c = -\frac{V}{2}\left[1 - \cos\left(\frac{T_1}{\sqrt{LC}}\right)\right] \quad (5)$$

In the case where the duration of pulse $V_c$ is $T_1$ in which $T_1$ equals $\pi \times \sqrt{LC}$, which characterizes the condition for a complete half sinusoid of current, Equation 5 becomes $V_c = -V$ and Equation 2 reduces to:

$$V_s = V_o \quad (6)$$

In practice the relationship defined by Equation 6 means that the output voltage of the converter appearing across the load must be equal to twice the secondary voltage of transformer $T_r$ which, in turn, is equal to the voltage applied across the converter input multiplied by the turns ratio of transformer $T_r$ if the primary current is allowed to complete a half sinusoid. From the foregoing the conclusion is that the circuit cannot be regulated as a function of changing input voltage by changing the time $T_2$ since the output voltage as given in Equation 6 is not functionally dependent on the time $T_2$. That conclusion is correct if the change of voltage on capacitor C is not restricted. In that event, if the time $T_2$ is increased, the voltage $V_c$ and the current i increase as the input voltage is increased, in such a way that the output voltage remains proportional to the secondary voltage (or to the input voltage) as predicted by Equation 6. The voltage swing on capacitor C is however restricted. The diodes $D_1$ and $D_2$ in the embodiment of FIG. 1 serve this purpose. The relationship defined by Equation 6 is thus no longer valid and the circuit can be regulated against input voltage changes by simply changing $T_2$.

In the converter the leakage inductance of the transformer serves the purpose previously served by a separate bulky inductor as we have previously used in systems for the traveling wave tube amplifier combination. Moreover, the peak current through transistors $Q_1$ and $Q_2$ in the embodiment of FIG. 1 is $\pi/2\, I_{AV}$. Moreover, transistors $Q_1$ and $Q_2$ are switched from a current-conducting to a noncurrent-conducting state only at the completion of a half sinusoid of current when the collector currents are at zero. So doing sharply reduces the power dissipation in the switching transistors to thus increase the efficiency of the DC to DC conversion. Moreover, the sinusoidal currents in $Q_1$ and $Q_2$ are changing relatively slowly avoiding the rapid transition from a high current to zero as in the case of those prior converters using a ramp-like current waveform by comparison, reducing generation of electromagnetic interference.

The discovery that series inductor $L_6$ can reduce peak current through the inverter switches $Q_1$ and $Q_2$ while maintaining a given converter output power level is believed to function as follows: Considering the steady state condition with switch $S_1$ in the closed position shunting out inductor $L_5$, inductor $L_6$ is effectively in the series current path with the diodes $D_1$ and $D_2$. With transistor $Q_1$ "on" during one cycle of inverter operation, current through the transformer primary having a half sinusoid waveshape supplies electrical charge to capacitor $C_A$ causing the voltage thereacross to increase and be of a positive polarity. Hence, the anode of diode $D_1$ becomes more positive in polarity. At some point in time during the half cycle, diode $D_1$ becomes forward biased, where the voltage on the anode is more positive than the voltage on its cathode, and the transformer primary current is shunted away from capacitor $C_A$ and through diode $D_1$. Effectively this circuit action "clamps" or limits the voltage at the diode end of capacitor $C_A$ to that voltage of terminal 1 (plus the very small voltage drop across diode $D_1$). As the half sinusoid of primary current is completed and transistor $Q_1$ switched off, the voltage at $C_A$ would remain clamped at the voltage, as occurs in the prior converter of U.S. Pat. No. 4,017,784. However, inductor $L_6$ stores energy in the electromagnetic field created by the series current therethrough and releases this energy by causing current to continue to flow even after the transformer primary current has ceased during the described half cycle of operation. This inductor generated current partially discharges capacitor $C_A$ at the conclusion of the half sinusoid of primary current so that the voltage across $C_A$ is slightly less than the voltage at input terminal 1. The same functional cooperation occurs during the next half cycle of operation in which the other transistor $Q_2$ is turned on to allow another half sinusoid of current to flow but in the opposite direction as depicted in FIG. 6k.

Referring to the partial mathematical analysis of Equations 1 and 2, the value of V is less because the value of $V_c$ is less due to the partial discharge of capacitor $C_A$. Therefore, the instantaneous primary current i is also reduced.

FIG. 3 illustrates graphically the change in collector peak current of the transistor for a given input voltage 308 volts versus various values of inductance for inductor $L_6$, where the leakage inductance of the transformer reflected to the primary is $50_{\mu h}$. The peak current decreases from 18 amps down to about 17.5 amps at a value of $L_6$ of $12_{\mu h}$, a selected value. It is also noted that the peak currents tend to increase above that comparable to $L_6=0$ if this inductor is made too large, above $25_{\mu h}$, or about 0.50 of the leakage inductance.

Thus $L_6$ should be selected to the value within the range of $0 < L_6 < 0.50$ LIP, where LIP is the leakage inductance reflected to the primary, which produces the minimum peak current during operation of the switching transistor. Reducing peak current in the circuit reduces power losses as is understood by those skilled in the art, and in a more practical sense the power output capability of an inverter is enhanced as that characteristic is usually limited by the peak current capacity of the switching transistors. The peak current reducing benefit is most pronounced at high values of input voltage at terminal 1 when it is most desirable and is least noticeable or not obtained when the input voltage is at the minimum design level.

The benefits and functional interrelationship of the inductance means achieved to limit peak current surges when power is initially applied to the converter, as represented by initial closure of switch $S_1$, is next considered. In a general sense, a single value of inductance cannot perform both benefits. For this benefit a value of inductance larger than the preceding case is desired, typically an inductance value which is equal to or slightly larger, up to ten percent larger, than the value of the leakage inductance of the secondary reflected to the primary side of the transformer, denoted LIP previously. And one way of accomplishing this is to place $L_5$ and $L_6$ in series so that the sum of the individual inductors equals the value desired, other arrangements being equally feasible as recognized by those skilled in the art.

When power is first applied to the converter switch $S_2$ is open placing the inductance at the level of $L_5+L_6$, the filter capacitors in the transformer secondary are in a discharged condition, hence $V_o=0$ in Equations 2 and 3. And it may be seen that the peak current could be twice as large as normal. The primary current is distorted as depicted by FIG. 4b, absent the series inductance rather than the desired sinusoid as depicted in FIG. 4a. The circuit operation is believed to operate in the same manner as described for the first value of inductance in reducing peak current with inductor $L_6$. That is, the partial discharge of capacitor $C_A$ in the primary at the end of each half cycle of operation. And it is found in practice that the peak current was reduced in one specific embodiment from twice the normal current level to only 25 percent over normal current.

At the conclusion of the desired interval switch $S_2$ is restored in its closed position removing $L_5$ from the circuit, either by operating switch manually or under control of a time delay device of conventional structure $S_3$, represented in dash lines, or which may be an electronic circuit which senses that the secondary voltage on the load capacitors has achieved a normal level.

A partial circuit analysis allows some insight as to the manner of operation but does not appear to be capable of straightforward analysis. Thus at turn-on the inverter switch current may be described by the equation:

$$i = \frac{i(o)}{L + L_p} (L_p + L \cos (aT)) \qquad (7)$$

where i is the instantaneous current at time T, $i_{(o)}$ is the current at T=0, as represented in FIG. 4c, and $a$ is a constant determined from the values of $C_A$ and $L_p$. If the inductance were removed from circuit, i.e. L=0, i remains at the value $i_{(o)}$ until the transistor $Q_1$ is turned off as observed in practice. As the level of inductance is increased, i begins to oscillate in level about the value of $i_{(o)}$ depicted in FIG. 4c. And where L=LIP the current i will drop to zero as represented by the dash line 6 and resembles the desired sinusoidal current waveshape, as is observed in practice.

As those skilled in the art recognize, either one or both of the above-described results may be incorporated within a single converter by adjustment of the inductance means in series circuit with the clamping diode.

To ensure completeness in this application, an embodiment of the circuit designated $RE_1$ in FIG. 1 and described heretofore in U.S. Pat. No. 4,017,784 is presented in block diagram form, understood by those skilled in the art, in FIG. 5, and the representative waveforms of voltages and currents, considered in connection therewith, is presented in FIG. 6.

In this circuit a resistor $R_1$ is connected in series with a resistor $R_2$ across the input terminals 3 and 4 to the circuit to form a voltage divider. A regulator REG is connected with its input at the juncture of $R_1$ and $R_2$ and its output is connected in series with a resistor $R_3$ to a first input of an And gate, AND$_1$, and to one end of capacitor C$_1$. The other end of the capacitor is connected in common with input terminal 3. Regulator REG represents any conventional integrated circuit regulator commercially available, such as a type 723. A transistor, Q$_r$, suitably an NPN type, is connected with its emitter connected in common with input 3 and its collector connected in series circuit with a resistor R$_4$ to the first input of AND$_1$.

The circuit includes three monostable type multivibrators identified as MONO$_1$, MONO$_2$ and MONO$_3$. These monostable multivibrators are conventional logic circuit elements which have the property of producing an output representing a first stable condition and which, when triggered by an input voltage, switches the output to a second condition, unstable, in which it remains for a predetermined period of time or duration, determined by internal circuit timing elements, and then self-restores to the first stable condition. The duration of each of the multivibrators in the unstable condition is set to the individual durations which accomplish the functions hereinafter described. Additionally, MONO$_1$ has two outputs A and $\overline{A}$ which are oppositely phased, i.e. when one output is at a voltage high the other output is at a voltage low.

The output of AND$_1$ is connected to the trigger input of MONO$_1$. The first output A of MONO$_1$ is connected to the trigger input of each of MONO$_2$ and MONO$_3$ and to the input of a flip-flop type multivibrator J-K. As is shown in the figure, the output of MONO$_2$ is connected in circuit with the second input of the And gate AND$_1$ and the output of MONO$_3$ is connected to the base of switching transistor Q$_r$.

Flip-flop J-K is a conventional bistable semiconductor switch device having two stable output conditions in which it may be set or placed by input pulses, that is, a first pulse switches the device into a first condition and the next pulse switches it to the second condition. This flip-flop further contains two outputs, such as Q and $\overline{Q}$, which are oppositely phased; one is at a voltage high when the other is at a voltage low, which is also a conventional characteristic. The circuit additionally includes two conventional Nand gates, identified as NAND$_1$ and NAND$_2$. The second output $\overline{A}$ of MONO$_1$ is connected to a first input of each of NAND$_1$ and NAND$_2$. The first output Q of flip-flop J-K is connected to a second input of NAND$_1$, while the alternate output $\overline{Q}$ of J-K is connected to a second input of NAND$_2$. The outputs of NAND$_1$ and NAND$_2$ serve respectively as the outputs of this circuit which are connected through isolation transformers, not illustrated, to the base terminals of the switching transistors in FIG. 1.

In its operation the voltage applied across inputs 3 and 4, the inverter output voltage that is to be regulated, represented as E, is divided across resistors R$_1$ and R$_2$, and a fraction of that voltage, appearing as a voltage drop across R$_2$, is applied to the input of the regulator REG. REG charges the capacitor C$_1$ through resistor R$_3$. The polarities are chosen so that capacitor C$_1$ is charged more slowly when input voltage E is greater than a predetermined nominal level and in that situation the inverter must reduce the frequency of the inverter pulses.

In connection with this description, reference is made to the waveforms presented in FIGS. 6a through 6k. Assuming hypothetically that the level of E increases at time T$_1$, a voltage perturbation, the regulating action is illustrated. Thus FIG. 6a illustrates the voltage across capacitor C$_1$ with the voltage perturbation occurring at a time T$_1$. As soon as the voltage across C$_1$ reaches a predetermined threshold level, MONO$_1$ is triggered to its unstable state, assuming the output of MONO$_2$ is at a voltage high. FIGS. 6b and 6e represent the voltages at the outputs A and $\overline{A}$, respectively, of MONO$_1$, including the on time, T$_2$, at output A, in which MONO$_1$ is in the unstable output condition. In turn, MONO$_2$ is triggered to its unstable condition by the transition of the output A of MONO$_1$, the A output going from a voltage high to low, that occurs when MONO$_1$ resets to its first stable state. With MONO$_2$ switched into its unstable condition, the output C goes from a voltage high to a low for a predetermined duration T$_3$ as is represented in FIG. 6c. Output C of MONO$_2$ is applied to one input of And gate AND$_1$. The And gate provides a voltage high output only if both of its inputs are at a voltage high. Hence, with a voltage low at one input, And gate AND$_1$ cannot respond during the interval T$_3$ and that prevents the voltage across capacitor C$_1$ from retriggering MONO$_1$ while MONO$_2$ is in its unstable condition.

The result is that a minimum time is set between succeeding pulses and that minimum time is independent of both the voltage E at the input to the circuit and the voltage appearing across capacitor C$_1$. That action removes any possibility for turning on the second switching transistor Q$_2$ in the inverter of FIG. 1 before the first switching transistor Q$_1$ is fully turned off to avoid possible circuit damage.

The positive transitions of output A of MONO$_1$, at the time the voltage goes from a low to a high, triggers MONO$_3$ into its unstable condition for a predetermined duration T$_4$, represented in FIG. 5d. The output of MONO$_3$ forward biases transistor Q$_r$ and transistor Q$_r$ switches "on" and conducts current in a circuit including capacitor C$_1$ and resistor R$_4$ to discharge capacitor C$_1$. In its discharged condition C$_1$ is prepared for operation in the next cycle.

Positive transitions, voltage low to high, of output A of MONO$_1$ alternately sets and resets flip-flop J-K. The waveforms of FIGS. 6f and 6g illustrate the two outputs Q and $\overline{Q}$ of this device. Output $\overline{A}$ of MONO$_1$ and output Q of the flip-flop provide the two inputs to Nand gate NAND$_1$. With both inputs low, NAND$_1$ produces a positive output as illustrated in FIG. 6h. In the same fashion, output $\overline{A}$ of MONO$_1$ and output $\overline{Q}$ of flip-flop J-K are coupled to the two gates respectively of Nand gate NAND$_2$. In turn, NAND$_2$ provides an output at a voltage high when its two inputs are at a voltage low which output of NAND$_2$ is illustrated by the waveform in FIG. 6j. The outputs of the circuit taken at terminals 3 and 4 may be amplified by conventional circuit means and applied, typically through a transformer to provide DC circuit isolation, to the respective base terminals of the two inverter switch transistors of FIG. 2. This produces the inverter transformer current waveforms illustrated in FIG. 6k. As is clearly depicted in FIG. 6k, the spacing between the current pulses increases after the time of occurrence of the voltage perturbation at T$_1$. It is recognized that the foregoing circuit in practice preferably includes conventional means to suppress overcurrent spikes and other conventional precautions which are not illustrated in order to present this circuit in as clear a manner as is possible.

The improved converter may be modified to incorporate other circuit features without departing from the scope of our invention. For example, where line transients exist in the power supply circuit, a protective circuit may be included which can be of the type disclosed in the co-pending application of D. H. Simmons, Ser. No. 842,604, filed Oct. 17, 1977, for "Protective Circuit for Transistorized Inverter-Rectifier Apparatus".

It is believed that the preceding description of the preferred embodiments of the invention is sufficient in detail to enable one skilled in the art to understand and practice the invention. However, it is expressly understood that our invention is not limited to those details presented for the foregoing purpose inasmuch as many variations upon the invention, improvements, substitutions of equivalent elements may be made by one skilled in the art upon reading this specification, all of which embody the invention. Accordingly, it is expressly understood that our invention is to be broadly construed within the full spirit and scope of the appended claims.

What we claim is:

1. In a DC to DC converter containing a transformer means, said transformer means including:
   a primary winding, and a secondary winding, said secondary winding being loosely coupled to said primary to provide a predetermined effective leakage inductance reflected to said primary winding;
   rectifier means connected to said secondary winding for supplying a rectified output;
   filter capacitor means coupled to the output of said rectifier means for smoothing said rectified voltage;
   means for connecting an electrical load across said filter capacitor means;
   second capacitor means, said second capacitor means connected in series circuit with said primary winding;
   input means for receiving a DC voltage for conversion to a different DC voltage;
   electronic switching means for periodically and alternately charging said second capacitor means with current in a first polarity direction over a first interval of time T followed by charging said second capacitor means with current in a second opposite polarity direction over a second interval of time T in a current path including said primary winding, said charging current derived from a DC voltage at said input means, said second capacitor means being sized relative to said leakage inductance of said transformer means and to the impedance characteristics of said electrical load and to said filter capacitor means for causing said current in said current path to have the waveform essentially of half sinusoids over a portion of each time interval;
   clamping diode means coupled to said second capacitor means for limiting the level of voltage across said second capacitor means during each interval of time to below the level applied across said input means; said diode means conducting additional current from said primary winding in shunt of said capacitor means responsive to the voltage across said capacitor means attaining approximately the voltage level of said input means during said time interval; and
   regulating means coupled to said electronic switching means for regulating said interval of time, T, or said periodicity as a function of voltage level monitored across said filter capacitor means to maintain said voltage across said filter capacitor means essentially at a constant level irrespective of the voltage variation at said input means;
   the improvement for reducing peak current level through said electronic switching means comprising in combination therewith:
   inductance means,
   said inductance means connected in series circuit between said clamping diode means and said second capacitor means,
   said inductance means responsive to said clamping diode means conducting current and to the instantaneous current level through said electronic switch means and primary winding;
   said inductance means for partially discharging said second capacitor means in a discharge current path through said clamping diode means prior to said electronic switching means repeating current conduction through said primary winding;
   whereby said partial discharge of said second capacitor means provides a reduced level of peak current through said electronic switching means.

2. The invention as defined in claim 1 wherein said inductance means comprises an inductance value $L_1$ of $0 < L_1 < \frac{1}{2}$ LIP, where LIP is said leakage inductance of said transformer means reflected to said primary winding.

3. The invention as defined in claim 1 wherein said inductance means comprises an inductance value $L_2$ of $0.9$ LIP $< L_2 < 1.1$ LIP, where LIP is said leakage inductance of said transformer means reflected to said primary winding.

4. The invention as defined in claim 1 and further including switching means coupled to said inductance means, said switching means for changing the value of said inductance means from between a value of $L_1$ to a value $L_2$, where $0 < L_1 < \frac{1}{2}$ LIP, and $0.9$ LIP, $< L_2 < 1.1$ LIP, where LIP is said leakage inductance of said transformer means as reflected to said primary winding.

5. An improved DC to DC converter comprising:
   a transformer having a primary winding and a secondary winding, said secondary being loosely coupled to said primary for providing an effective leakage reactance in series with said secondary winding as reflected to said primary winding side as an inductance of $L_{pl}$;
   first rectifier means and first filter capacitor means connected in series across said secondary;
   second rectifier means and second filter capacitor means connected in series across said secondary;
   said first and second capacitor means having an end connected in common to one end of said secondary;
   and said first and second rectifier means being poled oppositely to one another for conducting current through said secondary in a first and second direction, respectively;
   first and second transistor switching means;
   a pair of input terminals for receiving an input DC voltage;
   first pair of substantially identical capacitors connected in series across said input terminals;
   clamping diode means connected electrically in series across said input terminals and poled in the same direction;
   third capacitor means;
   inductance means;
   said third capacitor means and said inductance means connected in series between said juncture of said first pair of substantially identical capacitors and the juncture of said series connected diode means;

means connecting said juncture of said third capacitor means and said inductance means to one end of said primary of said transformer;

means connecting said first transistor switching means in circuit between said second end of said primary and one of said input terminals for conducting current in one direction through said primary; means for connecting second switching means in circuit between said second end of said primary and said second input terminal for conducting current in another direction through said primary;

said current through said primary passing into said third capacitor means to electrically charge said third capacitor means during each predetermined period of said control means;

control means adapted to alternately operate said first and second transistor switching means to conduct current for predetermined periods and at a predetermined rate;

means coupled across said first and second filter capacitor means responsive to the voltage thereacross for varying the rate of said control means as an inverse function of such voltage;

said clamping diode means adapted to shunt current past said third capacitor means responsive to the voltage at said capacitor means attaining approximately input DC voltage level during a predetermined period of said control means for limiting the voltage on said third capacitor means;

said inductance means for draining current from said third capacitor means to partially discharge said third capacitor means in preparation for a succeeding predetermined period of said control means responsive to said clamping diode means conducting current and the instantaneous level of current through said primary winding being at a level of zero during a predetermined period of said control means.

6. The invention as defined in claim 5 wherein said inductance means comprises an inductance value $L_1$ of $0 < L_1 < \frac{1}{2}$ LIP, where LIP is said leakage inductance of said transformer means reflected to said primary.

7. The invention as defined in claim 5 wherein said inductance means comprises an inductance value $L_2$ of $0.9$ LIP $< L_2 < 1.1$ LIP, where LIP is said leakage inductance of said transformer means reflected to said primary.

8. The invention as defined in claim 5 and further including switching means coupled to said inductance means, said switching means for changing the value of said inductance means from between a value of $L_1$ to a value $L_2$, where $0 < L_1 < \frac{1}{2}$ LIP, and $0.9$ LIP, $< L_2 < 1.1$ LIP, where LIP is said leakage inductance of said transformer means as reflected to said primary.

9. A DC to DC converter comprising:

a transformer having at least one primary winding and at least one secondary winding, said secondary winding being magnetically coupled to said primary winding so as to having a predetermined leakage inductance therebetween and said secondary winding being center tapped;

rectifier means connected to each end of said secondary winding;

filter capacitor means;

means connecting said rectifier means to one end of said filter capacitor means and means connecting said center tap to the remaining end of said capacitor means;

second capacitor means;

inductance means;

input terminal means;

electronic switching means for driving a current through said primary winding and said second capacitor means in series first in one direction and then in the opposite direction within a duty cycle, said current having the waveshape of a half sinusoid;

diode voltage clamping means coupled in series with said inductance means to said second capacitor means for preventing the voltage on said second capacitor means from exceeding the level at said input terminal means by shunting current from said primary winding, said inductance means for partially discharging said second capacitor means subsequent to said diode voltage clamping means shunting current from said primary winding to reduce the voltage on said second capacitor means slightly below the level at said input terminal means;

whereby said current through said primary winding comprises the waveshape of half sinusoids of alternate polarity separated by an interval of zero current; and means for monitoring the voltage across said load capacitor means for providing an output which varies the duty cycle of said electronic switching means, whereby said output voltage may be regulated against variations in input voltage.

10. The invention as defined in claim 9 wherein said inductance means comprises an inductance value $L_1$ of $0 < L_1 < \frac{1}{2}$ LIP, where LIP is said leakage inductance of said transformer means reflected to said primary.

11. The invention as defined in claim 9 wherein said inductance means comprises an inductance value $L_2$ of $0.9$ LIP $< L_2 < 1.1$ LIP, where LIP is said leakage inductance of said transformer means reflected to said primary.

12. The invention as defined in claim 9 and further including switching means coupled to said inductance means, said switching means for changing the value of said inductance means from between a value of $L_1$ to a value $L_2$, where $0 < L_1 < \frac{1}{2}$ LIP, and $0.9$ LIP, $< L_2 < 1.1$ LIP, where LIP is said leakage inductance of said transformer means as reflected to said primary.

* * * * *